(12) United States Patent
Tamura (10) Patent No.: US 12,441,343 B2
(45) Date of Patent: Oct. 14, 2025

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Takao Tamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 168 days.

(21) Appl. No.: 18/236,963

(22) Filed: Aug. 23, 2023

(65) Prior Publication Data

US 2024/0083447 A1    Mar. 14, 2024

(30) Foreign Application Priority Data

Sep. 8, 2022   (JP) .................................. 2022-142942

(51) Int. Cl.
*B60W 50/08*          (2020.01)

(52) U.S. Cl.
CPC ..... *B60W 50/082* (2013.01); *B60W 2420/403* (2013.01); *B60W 2520/10* (2013.01);
(Continued)

(58) Field of Classification Search
CPC ........... B60W 50/082; B60W 2556/40; B60W 2420/403; B60W 2520/10; B60W 2710/20; B60W 2720/106
See application file for complete search history.

(56) References Cited

U.S. PATENT DOCUMENTS

| | | | |
|---|---|---|---|
| 8,909,388 B1 * | 12/2014 | Kim ..................... | B60W 30/18 701/1 |
| 11,624,628 B2 * | 4/2023 | Nemec ............... | B62D 15/0295 701/430 |

(Continued)

FOREIGN PATENT DOCUMENTS

| | | |
|---|---|---|
| JP | 2017-061265 | 3/2017 |
| JP | 2018-020682 | 2/2018 |

(Continued)

OTHER PUBLICATIONS

Japanese Office Action for Japanese Patent Application No. 2022-142942 mailed Jun. 4, 2024.

*Primary Examiner* — Mohamad O El Sayah
(74) *Attorney, Agent, or Firm* — Amin, Turocy & Watson, LLP (57) ABSTRACT

Provided is a vehicle control device configured to acquire a camera image obtained by imaging a peripheral situation of a vehicle, control steering and acceleration or deceleration of the vehicle on the basis of the camera image and map information irrespective of an operation of a driver of the vehicle, determine a driving mode of the vehicle to be any of a plurality of driving modes including a first driving mode and a second driving mode, calculate a margin for the vehicle to continue traveling in the second driving mode on the basis of a speed of the vehicle and a distance to an intersection between a map road centerline indicated in the map information and any one of map road partition lines on both sides, and determine whether to cause the vehicle to continue the second driving mode referring to the map road centerline on the basis of the margin when the vehicle is traveling in the second driving mode referring to the map road centerline.

12 Claims, 7 Drawing Sheets

(52) U.S. Cl.
CPC ..... *B60W 2556/40* (2020.02); *B60W 2710/20* (2013.01); *B60W 2720/106* (2013.01)

(56) References Cited

U.S. PATENT DOCUMENTS

| | | | |
|---|---|---|---|
| 11,685,402 B2* | 6/2023 | Lee | B60W 50/0205 |
| | | | 701/27 |
| 2018/0037260 A1 | 2/2018 | Otake et al. | |
| 2018/0059674 A1* | 3/2018 | Kunisa | B60W 60/0057 |
| 2019/0227545 A1* | 7/2019 | Yoo | G05D 1/0223 |
| 2020/0307594 A1* | 10/2020 | Kato | B60K 35/81 |
| 2021/0276561 A1* | 9/2021 | Hayakawa | B60W 30/0956 |
| 2021/0291830 A1* | 9/2021 | Tamura | G06V 20/588 |
| 2021/0323606 A1* | 10/2021 | Namba | B62D 15/025 |
| 2022/0067398 A1* | 3/2022 | Tamura | B60W 60/0053 |
| 2022/0105930 A1 | 4/2022 | Kurakami | |
| 2022/0219692 A1* | 7/2022 | Taniguchi | B60W 30/12 |

FOREIGN PATENT DOCUMENTS

| | | |
|---|---|---|
| JP | 2018-105636 | 7/2018 |
| JP | 2022-059787 | 4/2022 |

* cited by examiner

| MARGIN TTLC | CAMERA RECOGNITION STATE | USE OF SECOND MAP INFORMATION | REFERENCE LINE | MODE | FUNCTION PROVIDED |
|---|---|---|---|---|---|
| LESS THAN FIRST THRESHOLD | — | × | CAMERA | MODE C | ALCA |
| SECOND THRESHOLD OR MORE | — | ○ | MAP | MODE B | ALC, ALCA, CSA, CDW, MERGING SUPPORT |
| FIRST THRESHOLD OR MORE AND LESS THAN SECOND THRESHOLD | CAMERA ROAD PARTITION LINE AND MAP ROAD PARTITION LINE MATCH AT LEAST ON ONE SIDE | ○ | CAMERA | MODE B | ALC, ALCA, CSA, CDW, MERGING SUPPORT |
| | CAMERA ROAD PARTITION LINE AND MAP ROAD PARTITION LINE DO NOT MATCH ON BOTH SIDES | × | CAMERA | MODE C | ALCA |
| | CAMERA ROAD PARTITION LINE ON ONE SIDE IS LOST, AND CAMERA ROAD PARTITION LINE ON THE OTHER SIDE AND MAP ROAD PARTITION LINE DO NOT MATCH | × | CAMERA | MODE C | ALCA |
| | CAMERA ROAD PARTITION LINES ON BOTH SIDES ARE LOST | × | CAMERA | MODE C → MODE E | ALCA |

VEHICLE CONTROL DEVICE, VEHICLE CONTROL METHOD, AND STORAGE MEDIUM

BACKGROUND

The present invention relates to a vehicle control device, a vehicle control method, and a storage medium.

DESCRIPTION OF RELATED ART

Since the past, a technique of controlling a vehicle on the basis of camera road partition lines recognized by a camera mounted on the vehicle and map road partition lines acquired from map information stored in advance has been known. For example, Japanese Unexamined Patent Application, First Publication No. 2017-061265 discloses that, in a case where camera road partition lines and map road partition lines match, lane keeping assist system (LKAS) control is performed on the basis of the camera road partition lines, while in a case where the camera road partition lines and the map road partition lines do not match, LKAS control is performed on the basis of camera road partition lines and map road partition lines of the previous cycle.

However, in the related art, in a case where traveling of a vehicle is controlled on the basis of the map road partition lines, particularly, a map road centerline, there have been cases where distortion of the map road centerline cannot be detected on the basis of map information alone, and driving control of the vehicle cannot be appropriately changed.

SUMMARY

The present invention was contrived in view of such circumstances, and one object thereof is to provide a vehicle control device, a vehicle control method, and a storage medium that make it possible to detect distortion of a map road centerline on the basis of map information alone and to appropriately change driving control of a vehicle.

The following configurations are adopted in a vehicle control device, a vehicle control method, and a storage medium according to this invention.

(1) According to an aspect of this invention, there is provided a vehicle control device including: a storage medium having computer-readable instructions stored therein; and a processor connected to the storage medium, wherein the processor executes the computer-readable instructions, to thereby acquire a camera image obtained by imaging a peripheral situation of a vehicle, control steering and acceleration or deceleration of the vehicle on the basis of the camera image and map information irrespective of an operation of a driver of the vehicle, determine a driving mode of the vehicle to be any of a plurality of driving modes including a first driving mode and a second driving mode and change the driving mode of the vehicle to a more task-intensive driving mode in a case where a task related to the determined driving mode is not executed by the driver, the second driving mode being a driving mode in which a task imposed on the driver is lighter than in the first driving mode, and some of the plurality of driving modes including at least the second driving mode being controlled irrespective of the operation of the driver of the vehicle, calculate a margin for the vehicle to continue traveling in the second driving mode on the basis of a speed of the vehicle and a distance to an intersection between a map road centerline indicated in the map information and any one of map road partition lines on both sides, and determine whether the processor causes the vehicle to continue the second driving mode referring to the map road centerline on the basis of the margin when the vehicle is traveling in the second driving mode referring to the map road centerline.

(2) In the aspect of the above (1), in a case where the margin is less than a first threshold, the processor changes the second driving mode referring to the map road centerline to the first driving mode referring to a camera road partition line shown in the camera image.

(3) In the aspect of the above (1), in a case where the margin is equal to or greater than a second threshold, the processor causes the vehicle to continue the second driving mode referring to the map road centerline.

(4) In the aspect of the above (1), in a case where the margin is equal to or greater than a first threshold and less than a second threshold, the processor changes the second driving mode referring to the map road centerline on the basis of the camera image and the map information.

(5) In the aspect of the above (4), in a case where the margin is equal to or greater than the first threshold and less than the second threshold, and a camera road partition line shown in the camera image and the map road partition line match at least on one side, the processor changes the second driving mode referring to the map road centerline to the second driving mode referring to the camera road partition line.

(6) In the aspect of the above (4), in a case where the margin is equal to or greater than the first threshold and less than the second threshold, and a camera road partition line shown in the camera image and the map road partition line do not match on either side, the processor changes the second driving mode referring to the map road centerline to the first driving mode referring to the camera road partition line.

(7) In the aspect of the above (4), in a case where the margin is equal to or greater than the first threshold and less than the second threshold, a camera road partition line on one side is not detected from the camera image, and a camera road partition line on the other side and the map road partition line do not match, the processor changes the second driving mode referring to the map road centerline to the first driving mode referring to the camera road partition line.

(8) In the aspect of the above (4), in a case where the margin is equal to or greater than the first threshold and less than the second threshold, and camera road partition lines on both sides are not detected from the camera image, the processor changes the second driving mode referring to the map road centerline to the first driving mode referring to the camera road partition lines obtained in an immediately preceding control cycle.

(9) In the aspect of the above (8), in a case where a state in which the camera road partition lines on both sides are not detected continues for a predetermined period of time, the processor changes the first driving mode referring to the camera road partition line to manual driving.

(10) In the aspect of the above (1), the second driving mode is a driving mode in which a task for grasping an operator that accepts a steering operation of the vehicle is not imposed on the driver, and the first driving mode is a driving mode in which a task for grasping the operator that accepts at least the driver's steering operation is imposed on the driver.

(11) According to another aspect of this invention, there is provided a vehicle control method including causing a computer to: acquire a camera image obtained by imaging a peripheral situation of a vehicle; control steering and acceleration or deceleration of the vehicle on the basis of the camera image and map information irrespective of an operation of a driver of the vehicle; determine a driving mode of the vehicle to be any of a plurality of driving modes including a first driving mode and a second driving mode and change the driving mode of the vehicle to a more task-intensive driving mode in a case where a task related to the determined driving mode is not executed by the driver, the second driving mode being a driving mode in which a task imposed on the driver is lighter than in the first driving mode, and some of the plurality of driving modes including at least the second driving mode being performed by controlling the steering and acceleration or deceleration of the vehicle irrespective of the operation of the driver of the vehicle; calculate a margin for the vehicle to continue traveling in the second driving mode on the basis of a speed of the vehicle and a distance to an intersection between a map road centerline indicated in the map information and any one of map road partition lines on both sides; and determine whether to cause the vehicle to continue the second driving mode referring to the map road centerline on the basis of the margin when the vehicle is traveling in the second driving mode referring to the map road centerline.

(12) According to another aspect of this invention, there is provided a computer readable non-transitory storage medium having a program stored therein, the program causing a computer to: acquire a camera image obtained by imaging a peripheral situation of a vehicle; control steering and acceleration or deceleration of the vehicle on the basis of the camera image and map information irrespective of an operation of a driver of the vehicle; determine a driving mode of the vehicle to be any of a plurality of driving modes including a first driving mode and a second driving mode and change the driving mode of the vehicle to a more task-intensive driving mode in a case where a task related to the determined driving mode is not executed by the driver, the second driving mode being a driving mode in which a task imposed on the driver is lighter than in the first driving mode, and some of the plurality of driving modes including at least the second driving mode being performed by controlling the steering and acceleration or deceleration of the vehicle irrespective of the operation of the driver of the vehicle; calculate a margin for the vehicle to continue traveling in the second driving mode on the basis of a speed of the vehicle and a distance to an intersection between a map road centerline indicated in the map information and any one of map road partition lines on both sides; and determine whether to cause the vehicle to continue the second driving mode referring to the map road centerline on the basis of the margin when the vehicle is traveling in the second driving mode referring to the map road centerline.

According to (1) to (12), it is possible to detect distortion of a map road centerline on the basis of map information alone and to appropriately change driving control of a vehicle.

DESCRIPTION OF EMBODIMENTS

Hereinafter, an embodiment of a vehicle control device, a vehicle control method, and a storage medium according to the present invention will be described with reference to the accompanying drawings.

[Overall Configuration]

Figure 1:
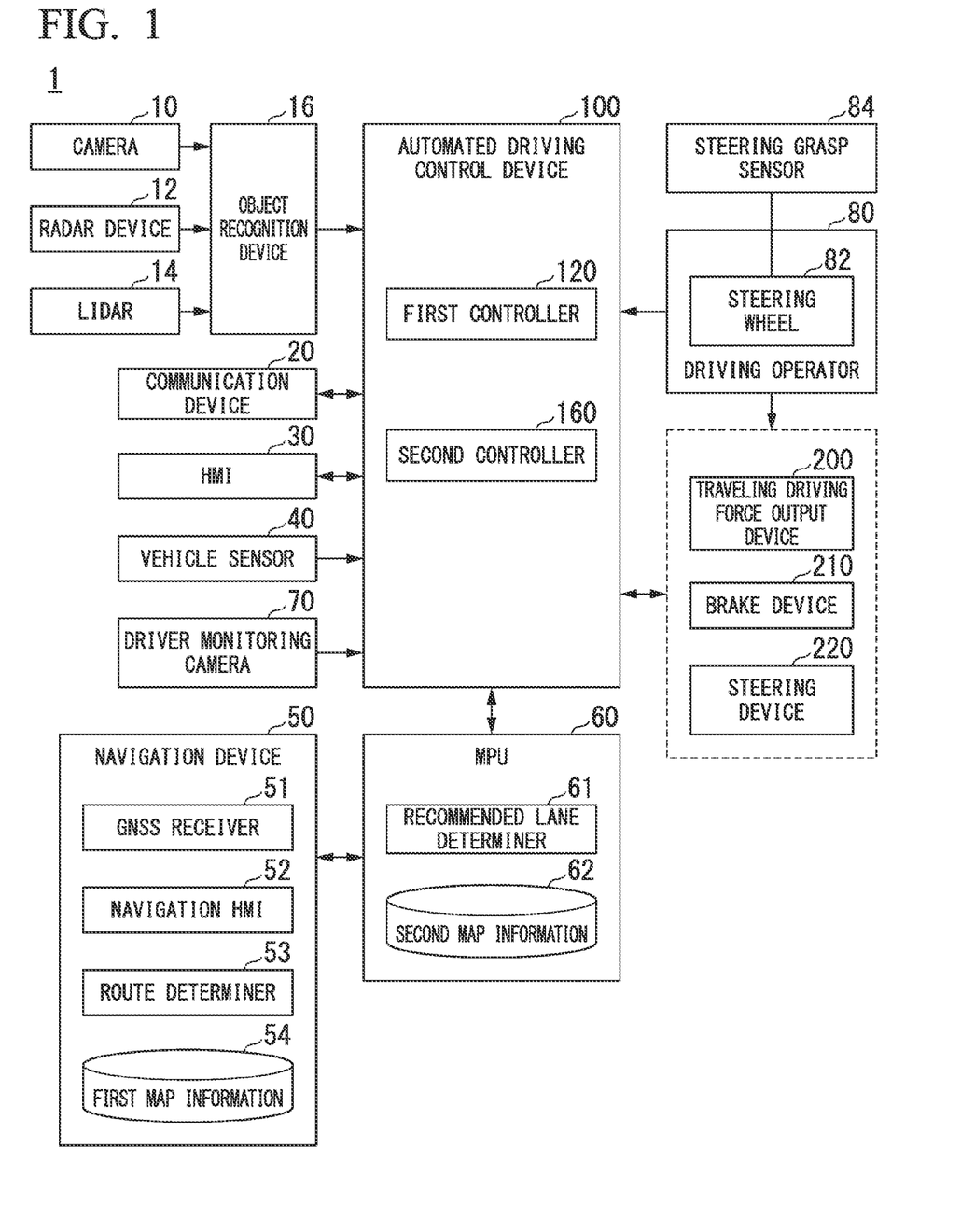
FIG. 1 is a configuration diagram of a vehicle system using a vehicle control device according to an embodiment.

FIG. 1 is a configuration diagram according to a vehicle system 1 using a vehicle control device according to an embodiment. A vehicle having the vehicle system 1 mounted therein is, for example, a two-wheeled, three-wheeled, or four-wheeled vehicle or the like, and the driving source thereof is an internal-combustion engine such as a diesel engine or a gasoline engine, an electric motor, or a combination thereof. The electric motor operates using power generated by a generator connected to an internal-combustion engine or discharging power of a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driver monitoring camera 70, a driving operator 80, an automated driving control device 100, a traveling driving force output device 200, a brake device 210, and a steering device 220. These devices or instruments are connected to each other through a multiplex communication line such as a controller area network (CAN) communication line, a serial communication line, a wireless communication network, or the like. Meanwhile, the configuration shown in FIG. 1 is merely an example, and some portions of the configuration may be omitted, or other configurations may be further added.

The camera 10 is a digital camera using a solid-state imaging element such as, for example, a charge coupled device (CCD) or a complementary metal oxide semiconductor (CMOS). The camera 10 is installed at any point on a vehicle having the vehicle system 1 mounted therein (hereinafter referred to as a host vehicle M). In a case where a forward image is captured, the camera 10 is installed on the upper portion of the front windshield, the rear surface of the rear-view mirror, or the like. The camera 10, for example, repeatedly captures an image of the vicinity of the host vehicle M periodically. The camera 10 may be a stereo camera.

The radar device 12 radiates radio waves such as millimeter waves to the vicinity of the host vehicle M, and detects radio waves (reflected waves) reflected from an object to detect at least the position (distance to and orientation of) of the object. The radar device 12 is installed at any point of the host vehicle M. The radar device 12 may detect the position and speed of an object with a frequency modulated continuous wave (FM-CW) system.

The LIDAR 14 irradiates the vicinity of the host vehicle M with light (or electromagnetic waves having a wavelength close to that of light), and measures scattered light. The LIDAR 14 detects a distance to an object on the basis of a time from light emission to light reception. The irradiation light is, for example, pulsed laser light. The LIDAR 14 is installed at any point on the host vehicle M.

The object recognition device 16 recognizes the position, type, speed, or the like of an object by performing a sensor fusion process on the results of detection performed by some or all of the camera 10, the radar device 12, and the LIDAR 14. The object recognition device 16 outputs the recognition results to the automated driving control device 100. The object recognition device 16 may output the detection results of the camera 10, the radar device 12, and the LIDAR 14, as they are, to the automated driving control device 100. The object recognition device 16 may be omitted from the vehicle system 1.

The communication device 20 communicates with another vehicle which is present in the vicinity of the host vehicle M using, for example, a cellular network, a Wi-Fi network, Bluetooth (registered trademark), dedicated short range communication (DSRC), or the like, or communicates with server devices of various types through a wireless base station.

The HMI 30 presents various types of information to an occupant of the host vehicle M, and accepts the occupant's input operation. The HMI 30 includes various display devices, a speaker, a buzzer, a touch panel, a switch, a key, and the like.

The vehicle sensor 40 includes a vehicle speed sensor that detects the speed of the host vehicle M, an acceleration sensor that detects an acceleration, a yaw rate sensor that detects an angular velocity around a vertical axis, an orientation sensor that detects the direction of the host vehicle M, or the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 identifies the position of the host vehicle M on the basis of a signal received from a GNSS satellite. The position of the host vehicle M may be specified or complemented by an inertial navigation system (INS) in which an output of the vehicle sensor 40 is used. The navigation HMI 52 includes a display device, a speaker, a touch panel, a key, and the like. A portion or the entirety of the navigation HMI 52 may be shared with the above-described HMI 30. The route determiner 53 determines, for example, a route (hereinafter, a route on a map) from the position (or any input position) of the host vehicle M specified by the GNSS receiver 51 to a destination input by an occupant using the navigation HMI 52 with reference to the first map information 54. The first map information 54 is, for example, information in which a road shape is represented by a link indicating a road and nodes connected by the link. The first map information 54 may include the curvature of a road, point of interest (POI) information, or the like. The route on a map is output to the MPU 60. The navigation device 50 may perform route guidance using the navigation HMI 52 on the basis of the route on a map. The navigation device 50 may be realized by the function of a terminal device such as, for example, a smartphone or a tablet terminal possessed by an occupant. The navigation device 50 may transmit its current position and destination to a navigation server through the communication device 20, and acquire the same route as the route on a map from the navigation server.

The MPU 60 includes, for example, a recommended lane determiner 61, and holds second map information 62 in a storage device such as an HDD or a flash memory. The recommended lane determiner 61 divides the route on a map provided from the navigation device 50 into a plurality of blocks (for example, divides the route on a map every 100 [m] in a vehicle traveling direction), and determines a recommended lane for each block with reference to the second map information 62. The recommended lane determiner 61 makes a determination on which lane from the left to travel along. In a case where a branch point is present in the route on a map, the recommended lane determiner 61 determines a recommended lane so that the host vehicle M can travel along a logical route for advancing to a branch destination.

The second map information 62 is map information having a higher accuracy than the first map information 54. The second map information 62 includes, for example, information of the center of a lane, information of the boundary of a lane, or the like. Particularly, in the present embodiment, the second map information 62 includes information relating to left and right road partition lines in the lane (hereinafter sometimes referred to as "map road partition lines") and the centerline of the lane (hereinafter sometimes referred to as the "map road centerline"). In addition, the second map information 62 may include road information, traffic regulation information, address information (an address or a postal code), facility information, telephone number information, information on a prohibited section in which a mode A or a mode B to be described later is prohibited, and the like. The second map information 62 may be updated when necessary by the communication device 20 communicating with another device.

The driver monitoring camera 70 is a digital camera using a solid-state imaging element such as, for example, a CCD or a CMOS. The driver monitoring camera 70 is installed at any point in the host vehicle M at a position and direction in which the head of an occupant who sits on a driver's seat of the host vehicle M (hereinafter referred to as a driver) can be imaged from the front (in a direction in which his/her face is imaged). For example, the driver monitoring camera 70 is installed on the upper portion of a display device provided in the central portion of the instrument panel of the host vehicle M.

The driving operator 80 includes, for example, an accelerator pedal, a brake pedal, a shift lever, and other operators in addition to a steering wheel 82. A sensor that detects the amount of operation or the presence or absence of operation is installed on the driving operator 80, and the detection results are output to the automated driving control device 100, or some or all of the traveling driving force output device 200, the brake device 210, and the steering device 220. The steering wheel 82 is an example of "an operator that accepts a steering operation by a driver." The operator does not necessarily have to be annular, and may be in the form of variant steering, a joystick, a button, or the like. A steering grasp sensor 84 is installed on a steering wheel 82. The steering grasp sensor 84 is realized by a capacitance sensor or the like, and outputs a signal that makes it possible to detect whether a driver is grasping the steering wheel 82 (which means that the driver is in contact with the steering wheel while applying force) to the automated driving control device 100.

The automated driving control device 100 includes, for example, a first controller 120 and a second controller 160. The first controller 120 and the second controller 160 are realized by a hardware processor such as, for example, a central processing unit (CPU) executing a program (software). In addition, Some or all of these components may be realized by hardware (a circuit unit; including circuitry) such as a large scale integration (LSI), an application specific integrated circuit (ASIC), a field-programmable gate array (FPGA), or a graphics processing unit (GPU), and may be realized by software and hardware in cooperation. The program may be stored in an HDD of the automated driving control device 100 or a storage device such as a flash memory (a storage device including a non-transitory storage medium) in advance, may be stored in a detachable storage medium such as a DVD or a CD-ROM, or may be installed in the HDD of the automated driving control device 100 or the flash memory by the storage medium (non-transitory storage medium) being mounted in a drive device. The automated driving control device 100 is an example of a "vehicle control device," and a combination of a behavior plan generator 140 and the second controller 160 is an example of a "driving controller."

Figure 2:
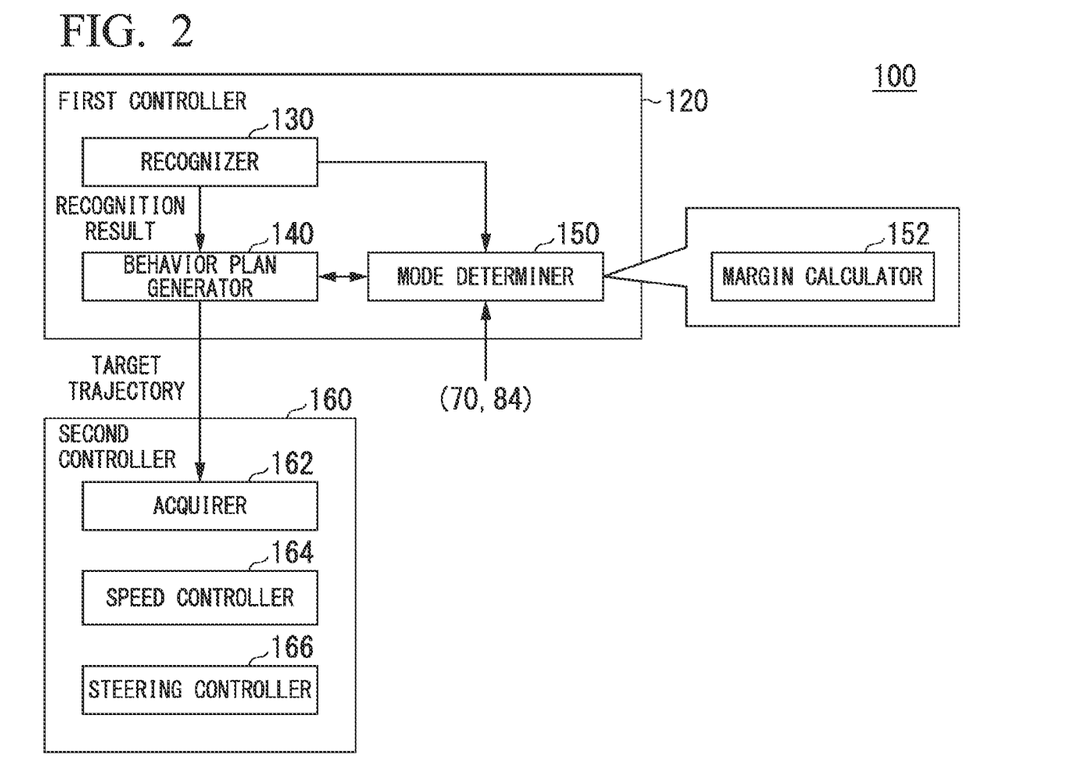
FIG. 2 is a functional configuration diagram of a first controller and a second controller.

FIG. 2 is a functional configuration diagram of the first controller 120 and the second controller 160. The first controller 120 includes, for example, a recognizer 130, a behavior plan generator 140, and a mode determiner 150. The first controller 120 concurrently realizes, for example, a function based on artificial intelligence (AI) and a function based on a model imparted in advance. For example, a function of "recognizing a point of intersection" may be realized by the recognition of a point of intersection based on deep learning or the like and recognition based on conditions (such as a signal or a road sign on which pattern matching is possible) imparted in advance being concurrently executed, and being comprehensively evaluated by performing scoring on both. Thereby, the reliability of automated driving is secured.

The recognizer 130 recognizes the state of the position, speed, acceleration, or the like of an object which is located in the vicinity of the host vehicle M on the basis of information which is input from the camera 10, the radar device 12, and the LIDAR 14 through the object recognition device 16. The position of the object is recognized as, for example, a position in absolute coordinates with a representative point (such as the centroid or the center of a drive shaft) of the host vehicle M as an origin, and is used in control. The position of the object may be represented by a representative point such as the centroid or a corner of the object, or may be represented by a region. The "state" of the object may include the acceleration or jerk of the object, or a "behavior state" (for example, whether it is performing or attempting to perform a lane change).

In addition, the recognizer 130 recognizes, for example, a lane (traveling lane) along which the host vehicle M travels. For example, the recognizer 130 recognizes a traveling lane by comparing a pattern of a road partition line (for example, an array of solid lines and broken lines) obtained from the second map information 62 with a pattern of a road partition line located in the vicinity of the host vehicle M which is recognized from an image captured by the camera 10. Meanwhile, the recognizer 130 may recognize a traveling lane by recognizing a driving boundary (road boundary) including a road partition line, a shoulder, a curbstone, a median strip, a guardrail, or the like without being limited to the recognition of a road partition line. Particularly, in the present embodiment, the recognizer 130 is assumed to recognize left and right road partition lines in the lane (hereinafter sometimes referred to as "camera road partition lines") and the centerline of the lane (hereinafter sometimes referred to as the "camera road centerline") on the basis of the image captured by the camera 10. In this recognition, the position of the host vehicle M acquired from the navigation device 50 or processing results based on an INS may be added. In addition, the recognizer 130 recognizes a stop line, an obstacle, a red light, a tollbooth, and other road events.

Upon recognizing a traveling lane, the recognizer 130 recognizes the position or posture of the host vehicle M with respect to the traveling lane. The recognizer 130 may recognize, for example, deviation of the host vehicle M from the center of the lane which is a reference point, and an angle formed with respect to a line aligned with the center of the lane of the host vehicle M in its traveling direction, as the relative position and posture of the host vehicle M with respect to the traveling lane. Instead, the recognizer 130 may recognize the position of the reference point of the host vehicle M or the like with respect to either lateral end portion (a road partition line or a road boundary) of the traveling lane, as the relative position of the host vehicle M with respect to the traveling lane. The recognizer 130 is an example of an "acquirer."

The behavior plan generator 140 generates a target trajectory along which the host vehicle M will travel in the future automatically (irrespective of a driver's operation) so that the host vehicle M travels in the recommended lane determined by the recommended lane determiner 61 in principle and can cope with the peripheral situation of the host vehicle. The target trajectory includes, for example, a speed element. For example, the target trajectory may be represented as a trajectory obtained by arranging points (trajectory points) at which the host vehicle M will arrive in order. The trajectory points are points at which the host vehicle M will arrive after predetermined traveling distances (for example, approximately every several [m]) which are distances along a road. Separately from the trajectory points, a target speed and a target acceleration for each predetermined sampling time (for example, several tenths of a [sec]) are generated as a portion of the target trajectory. In addition, the trajectory points may be positions at which the host vehicle M will arrive at sampling times for respective predetermined sampling times. In this case, information of a target speed or target acceleration is represented by an interval between trajectory points.

The behavior plan generator 140 may set automated driving events when generating a target trajectory. Examples of automated driving events include a constant-speed traveling event, a low-speed following traveling event, a lane change event, a diverging event, a merging event, a passing event, and the like. The behavior plan generator 140 generates a target trajectory according to a started event.

The mode determiner 150 determines the driving mode of the host vehicle M to be one of a plurality of driving modes in which a task imposed on the driver is different. The mode determiner 150 includes, for example, a margin calculator 152. The functions of the margin calculator 152 will be described later.

Figure 3:
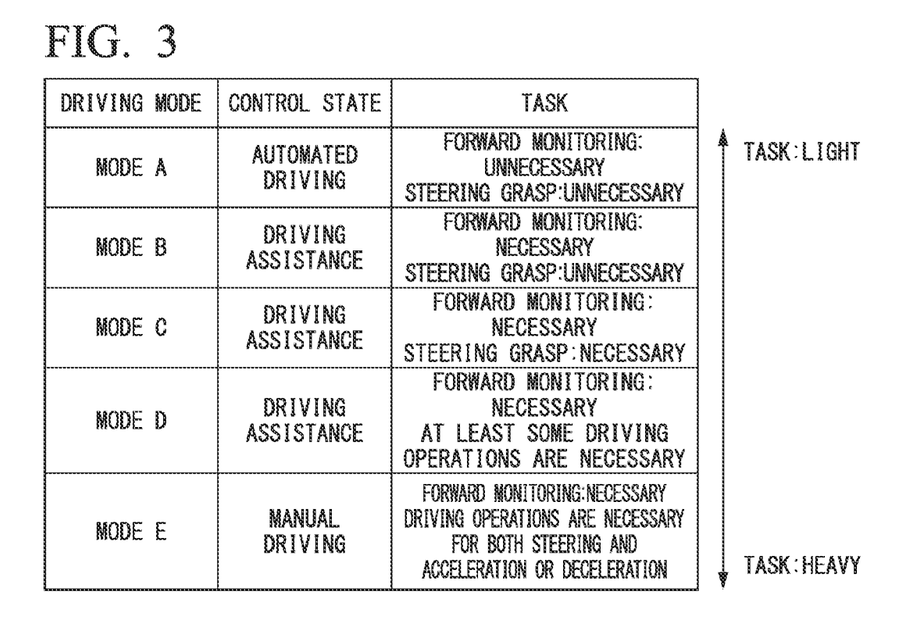
FIG. 3 is a diagram illustrating an example of a correspondence relation between a driving mode, a control state of a host vehicle, and a task.

FIG. 3 is a diagram showing an example of a correspondence relation between a driving mode, a control state of the host vehicle M, and a task. The driving mode of the host vehicle M includes, for example, five modes from a mode A to a mode E. The degree of automation of the control state, that is, the driving control of the host vehicle M, is highest in the mode A, then in the order of the mode B, the mode C, and the mode D, and is lowest in the mode E. On the other hand, a task imposed on the driver is lightest in the mode A, then in the order of the mode B, the mode C, and the mode D, and is heaviest in the mode E. Meanwhile, in the modes D and E, since the control state is not a state of automated driving, the automated driving control device 100 is responsible for ending control related to automated driving and transitioning to driving assistance or manual driving. Hereinafter, the content of each driving mode will be exemplified.

In the mode A, the state of automated driving is set, and neither forward monitoring nor grasping of the steering wheel 82 (steering grasping in the drawing) is imposed on the driver. However, even in the mode A, the driver is required to be in a position to quickly transition to manual driving in accordance with a request from the system centered on the automated driving control device 100. Meanwhile, the term "automated driving" used herein means that both steering and acceleration or deceleration are controlled irrespective of the driver's operation. The front is a space in the traveling direction of the host vehicle M which is visually recognized through the front windshield. The mode A is a driving mode that can be executed in a case where, for example, on a highway for the exclusive use of cars such as an expressway, the host vehicle M is traveling at a predetermined speed (for example, approximately 50 [km/h]) or less and a condition such as the presence of a preceding vehicle that is a following target is satisfied, and is referred to as traffic jam pilot (TJP) in some cases. In a case where such a condition is not satisfied, the mode determiner 150 changes the driving mode of the host vehicle M to the mode B.

In the mode B, the state of driving assistance is set, and a task of monitoring the front of the host vehicle M (hereinafter referred to as forward monitoring) is imposed on the driver, but a task of grasping the steering wheel 82 is not imposed. In the mode C, the state of driving assistance is set, and a task of forward monitoring and a task of grasping the steering wheel 82 are imposed on the driver. The mode D is a driving mode in which the driver's driving operation is required to some extent with respect to at least one of steering and acceleration or deceleration of the host vehicle M. For example, in the mode D, driving assistance such as adaptive cruise control (ACC) or a lane keeping assist system (LKAS) is executed. In the mode E, both steering and acceleration or deceleration are in a state of manual driving that requires the driver's driving operation. In both the mode D and the mode E, a task of monitoring the front of the host vehicle M is naturally imposed on the driver.

The automated driving control device 100 (and driving assistance device (not shown)) executes an automatic lane change according to the driving mode. The automatic lane change includes an automatic lane change (1) requested by a system and an automatic lane change (2) requested by a driver. The automatic lane change (1) includes an automatic lane change for passing which is performed in a case where the speed of a preceding vehicle is lower than the speed of the host vehicle by a reference value or more and an automatic lane change for advancing toward a destination (automatic lane change due to a change of a recommended lane). The automatic lane change (2) involves changing the lane of the host vehicle M in the direction of operation in a case where the direction indicator is operated by a driver in a case where conditions related to speed, positional relationship with nearby vehicles, and the like are satisfied.

The automated driving control device 100 does not execute either of the automatic lane changes (1) and (2) in the mode A. The automated driving control device 100 executes both of the automatic lane changes (1) and (2) in the modes B and C. In the mode D, the driving assistance device (not shown) executes the automatic lane change (2) without executing the automatic lane change (1). In the mode E, neither of the automatic lane changes (1) and (2) is executed.

In a case where a task related to a determined driving mode (hereinafter referred to as a current driving mode) is not executed by the driver, the mode determiner 150 changes the driving mode of the host vehicle M to a driving mode in which a task is heavier.

For example, in the mode A, in a case where the driver is in a position where transition to manual driving cannot be performed in accordance with a request from the system (for example, in a case where the driver continues to look outside an allowable area or a case where a sign of difficulty in driving is detected), the mode determiner 150 performs control such as prompting the driver to transition to manual driving using the HMI 30, gradually stopping the host vehicle M on the side of a road when the driver does not respond, and stopping automated driving. After the automated driving is stopped, the host vehicle is in the state of the mode D or E, and the host vehicle M can be started by the driver's manual operation. Hereinafter, the same applies to "stop automated driving." In a case where the driver is not monitoring the front in the mode B, the mode determiner 150 performs control such as prompting the driver to perform forward monitoring using the HMI 30, gradually stopping the host vehicle M on the side of a road when the driver does not respond, and stopping the automated driving. In a case where the driver is not monitoring the front in the mode C or is not grasping the steering wheel 82, the mode determiner 150 performs control such as prompting the driver to perform forward monitoring and/or grasp the steering wheel 82 using the HMI 30, gradually stopping the host vehicle M on the side of a road when the driver does not respond, and stopping the automated driving.

The second controller 160 controls the traveling driving force output device 200, the brake device 210, and the steering device 220 so that the host vehicle M passes along the target trajectory generated by the behavior plan generator 140 according to scheduled times.

Referring back to FIG. 2, the second controller 160 includes, for example, an acquirer 162, a speed controller 164, and a steering controller 166. The acquirer 162 acquires information of the target trajectory (trajectory point) generated by the behavior plan generator 140, and stores the acquired information in a memory (not shown). The speed controller 164 controls the traveling driving force output device 200 or the brake device 210 on the basis of a speed element associated with the target trajectory stored in the memory. The steering controller 166 controls the steering device 220 in accordance with the bent state of the target trajectory stored in the memory. The processes of the speed controller 164 and the steering controller 166 are realized by, for example, a combination of feedforward control and feedback control. As an example, the steering controller 166 executes a combination of feedforward control according to the curvature of a road in front of the host vehicle M and feedback control based on deviation from the target trajectory.

The traveling driving force output device 200 outputs a traveling driving force (torque) for a vehicle to travel to a driving wheel. The traveling driving force output device 200 includes, for example, a combination of an internal-combustion engine, an electric motor, a transmission or the like, and an electronic controller (ECU) that controls these components. The ECU controls the above components in accordance with information which is input from the second controller 160 or information which is input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information which is input from the second controller 160 or the information which is input from the driving operator 80, and causes a brake torque according to a braking operation to be output to each wheel. The brake device 210 may include a mechanism that transfers hydraulic pressure generated by the operation of a brake pedal included in the driving operator 80 through a master cylinder to the cylinder as a backup. Meanwhile, the brake device 210 is not limited to the above-described configuration, and may be an electronic control type hydraulic brake device that controls an actuator in accordance with the information which is input from the second controller 160 and transfers hydraulic pressure of the master cylinder to the cylinder.

The steering device 220 includes, for example, a steering ECU and an electric motor. The electric motor changes the direction of a turning wheel, for example, by causing a force to act on a rack and pinion mechanism. The steering ECU drives the electric motor in accordance with the information which is input from the second controller 160 or the information which is input from the driving operator 80, and changes the direction of the turning wheel.

[Operation of Vehicle Control Device]

Figure 4:
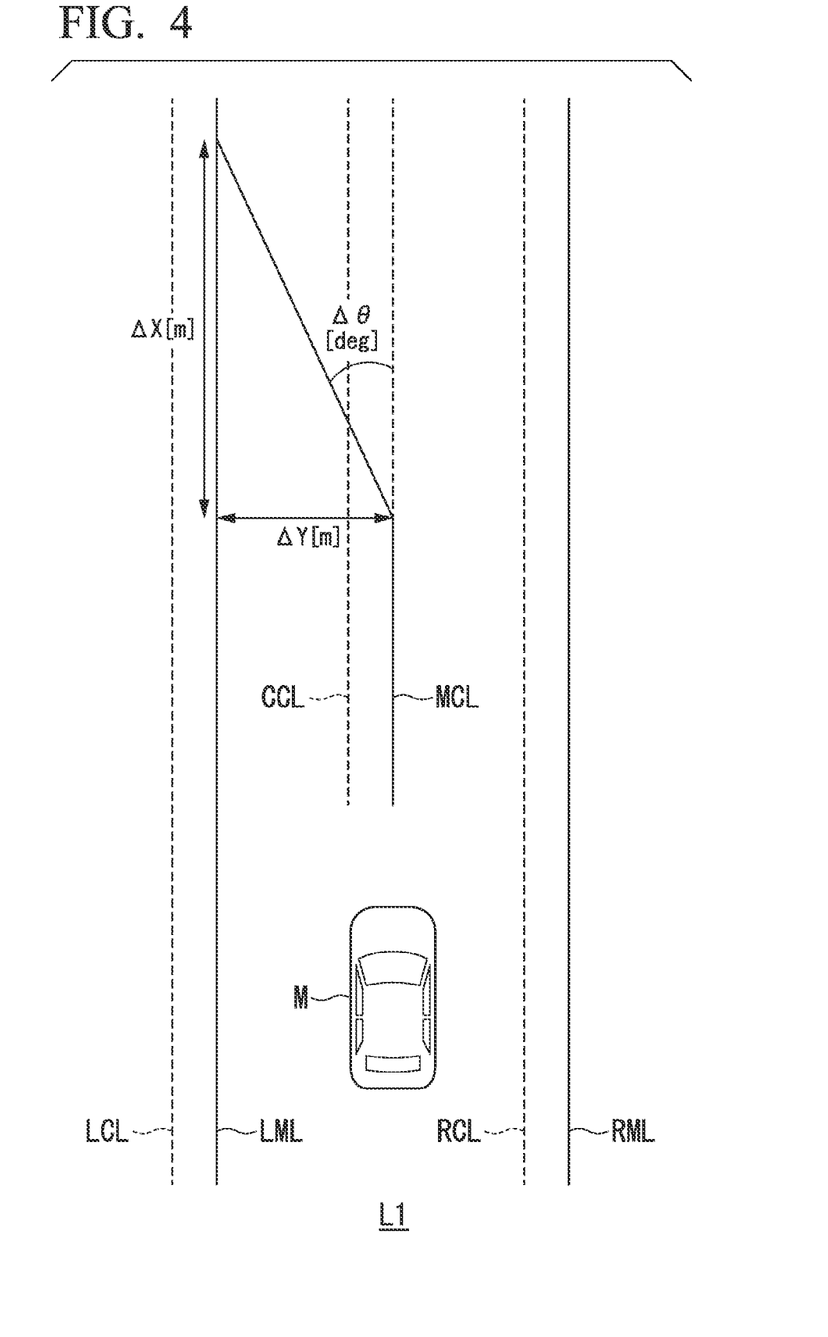
FIG. 4 is a diagram illustrating an example of a situation in which the operation of the vehicle control device according to the embodiment is executed.

Next, the operation of a vehicle control device according to an embodiment will be described. FIG. 4 is a diagram illustrating an example of a situation in which the operation of the vehicle control device according to the embodiment is executed. In the situation shown in FIG. 4, it is assumed that the driving mode of the host vehicle M is the mode B and that the host vehicle M is traveling in a lane L1 with a map road centerline MCL included in the second map information 62 as a reference line (that is, along the map road centerline MCL). Further, in FIG. 4, the mark LML indicates a left map road partition line, the mark RML indicates a right map road partition line, the mark MCL indicates a map road centerline, the mark LCL indicates a camera road partition line, and the mark CCL indicates a camera road centerline. The map road centerline MCL is stored in advance in the second map information 62, and the camera road centerline CCL is derived as the centerline of the left and right camera road partition lines LCL and RCL when these lines are acquired. Hereinafter, the left and right map road partition lines and the left and right camera road partition lines may be referred to collectively as the "map road partition line ML" and the "camera road partition line CL," respectively.

As shown in FIG. 4, the host vehicle M is traveling with the map road centerline MCL as a reference line, but the map road centerline MCL is distorted significantly to the left in the forward direction of travel, which may cause a problem for the host vehicle M to continue the driving mode of the mode B referring to the map road centerline MCL. In this case, when the distortion of the map road centerline MCL can be detected on the basis of only the second map information 62 (that is, the map road partition line and the map road centerline), the processing load on the vehicle control device is also small, which is preferable. Therefore, the margin calculator 152 calculates a margin that allows the host vehicle M to continue the driving mode of the mode B referring to the map road centerline MCL on the basis of the second map information 62 alone using a method to be described below, and the mode determiner 150 determines the driving mode on the basis of the calculated margin.

The margin calculator 152 first calculates an angle difference $\Delta\theta\_L$ between the map road centerline MCL and the left map partition line LML and an angle difference $\Delta\theta\_R$ between the map road centerline MCL and the right map partition line RML in a predetermined range in front of the host vehicle M (for example, a range from a position three seconds ahead to a position several tens of meters ahead with the current speed of the host vehicle M as a reference), and calculates an average angle difference $\Delta\theta$ therebetween.

Next, in a case where the map road centerline MCL deviates in either direction of the left map partition line LML and the right map partition line RML, the margin calculator 152 obtains the lateral distance $\Delta Y$ between the map road centerline MCL and the map partition. More specifically, in the case of the situation shown in FIG. 4, the margin calculator 152 determines that the map road centerline MCL deviates in the direction of the left map partition line LML, and obtains the lateral distance $\Delta Y$ between the map road centerline MCL and the left map partition line LML. Here, the lateral distance $\Delta Y$ is calculated, for example, as an average distance between points (horizontally paired points) constituting the left map partition line LML and the map road centerline MCL existing in the above predetermined range.

Next, the margin calculator 152 calculates the vertical distance $\Delta X$ until the map road centerline MCL and the left map partition line LML intersect in the future on the basis of the calculated angle difference $\Delta\theta$ and lateral distance $\Delta Y$. Next, the margin calculator 152 calculates the time to lane crossing (TTLC)=$\Delta X/V$ until the host vehicle M deviates from the lane L1 on the basis of the calculated vertical distance $\Delta X$ and the current speed V of the host vehicle M, and calculates this time TTLC as the margin.

Figure 5:
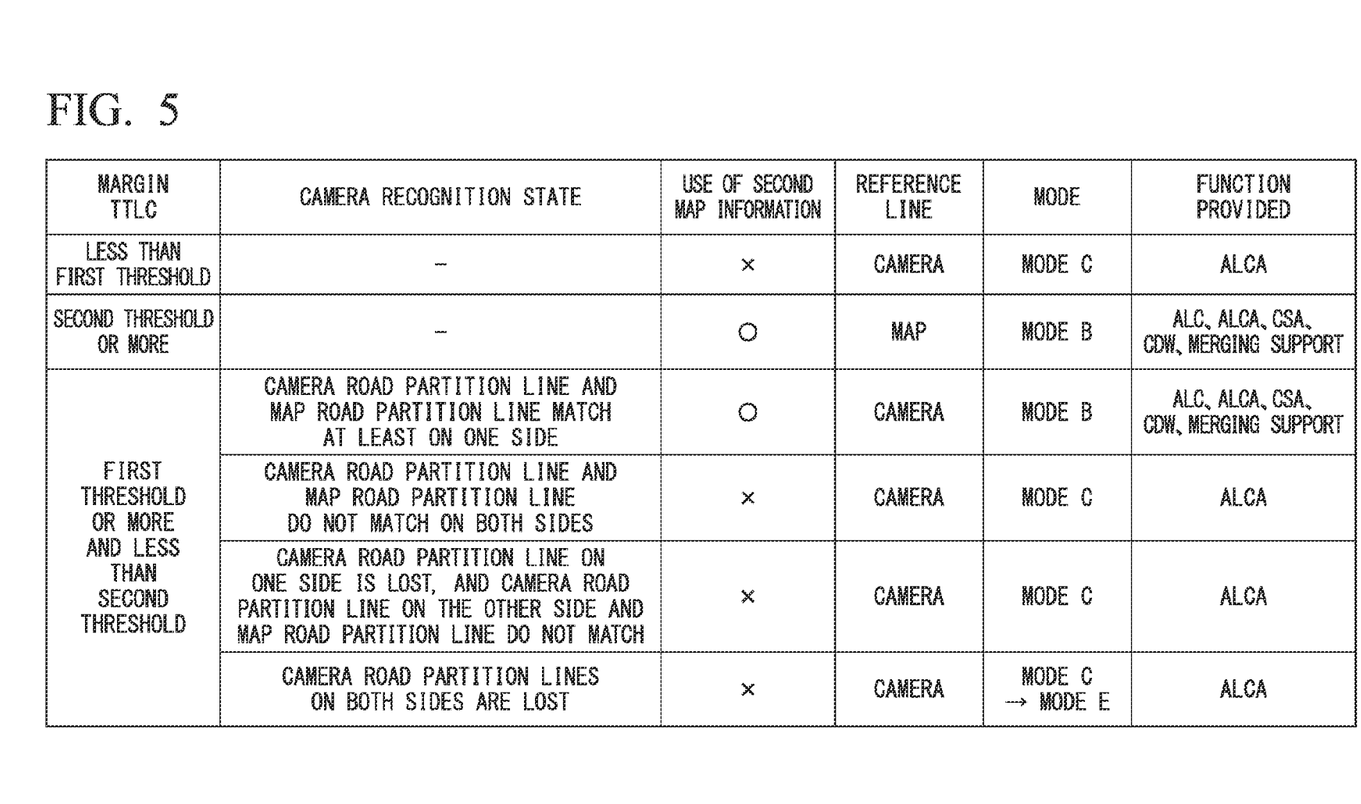
FIG. 5 is a diagram illustrating a method in which a mode determiner determines a driving mode on the basis of a margin.

The mode determiner 150 determines whether to continue the driving mode of the mode B referring to the map road centerline MCL or the change another driving mode on the basis of the margin TTLC calculated by the margin calculator 152. FIG. 5 is a diagram illustrating a method in which the mode determiner 150 determines the driving mode on the basis of the margin TTLC. As shown in FIG. 5, in a case where the calculated margin TTLC is less than a first threshold (for example, 2 seconds), the mode determiner 150 changes the driving mode of the mode B referring to the map road centerline MCL to the driving mode of the mode C referring to the camera road centerline CCL (that is, with the camera road centerline CCL as a reference line). This is because in a case where the margin TTLC is less than the first threshold, the time until the host vehicle M traveling along the map centerline CCL deviates from its lane is imminent, and it is preferable to abandon the map centerline CCL immediately (abandon the second map information 62) and switch to traveling referring to the camera road centerline CCL. In addition, at this time, as described above, in the driving mode of the mode C, a task for grasping the steering wheel 82 is imposed on the occupant, and thus an automatic lane change assist (ALCA) function is provided unlike the driving mode of the mode B in which an automatic lane change (ALC) function is provided. The details of the ALC function and the ALCA function are the same as known functions.

In a case where the calculated margin TTLC is equal to or greater than a second threshold (for example, 5 seconds), the mode determiner 150 continues the driving mode of the mode B referring to the map road centerline MCL. This is because in a case where the margin TTLC is equal to or greater than the second threshold, it is assumed that there is enough time for the host vehicle M traveling along the map centerline CCL to deviate from its lane, and that there is no problem in continuing the driving mode of the mode B referring to the map road centerline MCL. In this case, in the driving mode of the mode B, functions such as an ALC function, an ALCA function, a curve speed assist (CSA) function, a curve departure warning (CDW) function, and a merging support function are provided. The details of functions such as the CSA function, the CDW function, and the merging support function are also the same as known functions.

In a case where the calculated margin TTLC is equal to or greater than the first threshold and less than the second threshold, this means that the time required for the host vehicle M traveling along the map centerline CCL to deviate from its lane is short to some extent, and that the mode determiner 150 needs to change the driving mode of the mode B referring to the map road centerline MCL depending on the situation of the camera road partition line CL and the map road partition line ML. Consequently, the mode determiner 150 changes the driving mode of the mode B referring to the map road centerline MCL in accordance with the pattern to be described below depending on the situation of the camera road partition line CL and the map road partition line ML.

First, as one pattern, the mode determiner 150 changes the driving mode of the mode B referring to the map road centerline MCL to the driving mode of the mode B referring to the camera road centerline CCL in a case where the calculated margin TTLC is equal to or greater than the first threshold and less than the second threshold and a case where the camera road partition line CL and the map road partition line ML match at least on one side. In this case, the use of the second map information 62 continues, and thus the above-described driving assistance function (for example, ALC function) using the second map information 62 also continues to be provided. Meanwhile, here, the fact that the camera road partition line CL and the map road partition line ML "match" means that, for example, the distance or angle in a predetermined range between the camera road partition line CL and the map road partition line ML is within a threshold.

As another pattern, the mode determiner 150 changes the driving mode of the mode B referring to the map road centerline MCL to the driving mode of the mode C referring to the camera road centerline CCL in a case where the calculated margin TTLC is equal to or greater than the first threshold and less than the second threshold and case where the camera road partition line CL and the map road partition line ML do not match on either side. Also at this time, as in the case where the calculated margin TTLC is less than the first threshold, the second map information 62 is abandoned and only the ALCA function is provided.

As another pattern, the mode determiner 150 changes the driving mode of the mode B referring to the map road centerline MCL to the driving mode of the mode C referring to the camera road partition line CL on the other side (that is, with the camera road partition line CL on the other side as a reference line) in a case where the calculated margin TTLC is equal to or greater than the first threshold and less than the second threshold, a case where the camera road partition line CL on one side is not detected from a camera image by the recognizer 130 (that is, the camera road partition line CL on one side is lost), and a case where the camera road partition line CL on the other side and the map road partition line ML do not match. In this case, the host vehicle M travels, for example, along a reference line obtained by shifting the camera road partition line CL on the other side by a predetermined width in the direction of the host vehicle M. Also at this time, at in the case where the calculated margin TTLC is less than the first threshold, the second map information 62 is abandoned and only the ALCA function is provided.

As another pattern, the mode determiner 150 changes the driving mode of the mode B referring to the map road centerline MCL to the driving mode of the mode C referring to the camera road partition line CL obtained (that is, not lost) in the immediately preceding control cycle in a case where the calculated margin TTLC is equal to or greater than the first threshold and less than the second threshold and a case where the camera road partition lines CL on both sides are lost. In a case where the camera road partition line CL of the immediately preceding control cycle exists on both sides, the host vehicle M travels, for example, along the camera road centerline CCL of the immediately preceding control cycle. On the other hand, in a case where the camera road partition line CL of the immediately preceding control cycle exists only on one side, the host vehicle M travels, for example, along a reference line obtained by shifting the camera road partition line CL by a predetermined width in the direction of the host vehicle M. Also at this time, as in the case where the calculated margin TTLC is less than the first threshold, the second map information 62 is abandoned and only the ALCA function is provided.

In this way, in a case where the camera road partition lines CL on both sides are lost, the mode determiner 150 causes the host vehicle M to travel on the basis of the camera road partition lines CL obtained in the immediately preceding control cycle, but it is not preferable to cause the host vehicle M to travel for a long time on the basis of the past camera road partition lines CL. Therefore, the mode determiner 150 changes the driving mode to the mode E, that is, manual driving, in a case where the driving mode is changed to the driving mode of the mode C referring to the camera road partition lines CL obtained in the immediately preceding control cycle and then the camera road partition lines CL on both sides are continuously lost for a predetermined period of time.

Figure 6:
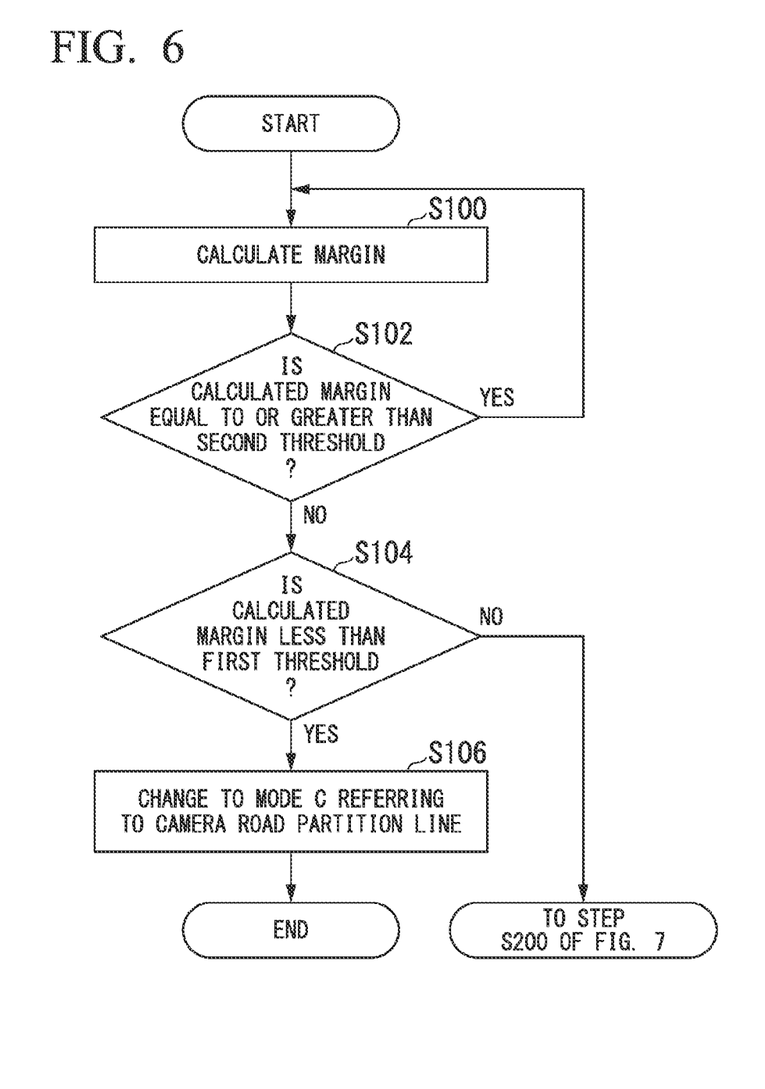
FIG. 6 is a flowchart illustrating an example of a flow of operations which are executed by the vehicle control device according to the embodiment.

Next, a flow of operations which are executed by the vehicle control device according to the embodiment will be described with reference to FIG. 6. FIG. 6 is a flowchart illustrating an example of a flow of operations which are executed by the vehicle control device according to the embodiment. The processing according to the present flowchart is executed in a predetermined cycle while the host vehicle M is traveling in the driving mode of the mode B referring to the map centerline MCL.

First, the margin calculator 152 calculates the margin TTLC on the basis of the map road partition lines ML and the map road centerline MCL included in the second map information 62 (step S100). Next, the mode determiner 150 determines whether the calculated margin TTLC is equal to or greater than the second threshold (step S102).

In a case where it is determined that the calculated margin TTLC is equal to or greater than the second threshold, the mode determiner 150 continues the driving mode of the mode B referring to the map centerline MCL, and the margin calculator 152 calculates the margin TTLC again in the next control cycle. On the other hand, in a case where it is determined that the calculated margin TTLC is less than the second threshold, the mode determiner 150 determines whether the calculated margin TTLC is less than the first threshold (step S104).

In a case where it is determined that the calculated margin TTLC is less than the first threshold, the margin calculator 152 changes the driving mode of the mode B referring to the map road centerline MCL to the driving mode of the mode C referring to the camera road partition lines CL (step S106). On the other hand, in a case where it is determined that the calculated margin TTLC is equal to or greater than the first threshold, the mode determiner 150 transitions the process to step S200 in FIG. 7.

Figure 7:
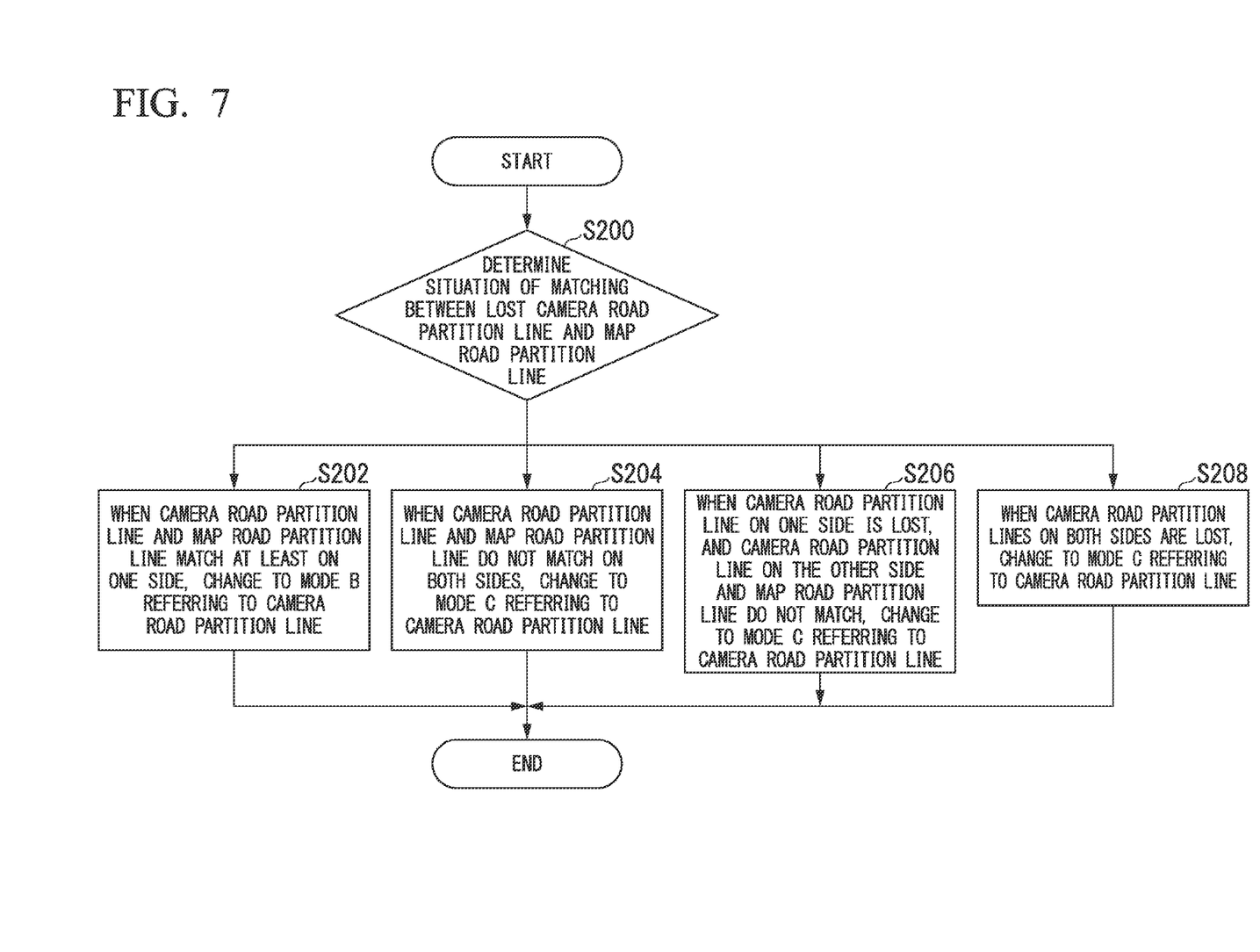
FIG. 7 is a flowchart illustrating another example of a flow of operations which are executed by the vehicle control device according to the embodiment.

FIG. 7 is a flowchart illustrating another example of a flow of operations which are executed by the vehicle control device according to the embodiment. The processing of the flowchart shown in FIG. 7 is executed in a case where it is determined in step S104 of FIG. 6 that the calculated margin TTLC is equal to or greater than the first threshold.

First, the mode determiner 150 determines the situation of matching between the lost camera road partition line CL and the map road partition line ML (step S200). More specifically, in a case where the camera road partition line CL and the map road partition line ML match at least on one side, the mode determiner 150 changes the driving mode of the mode B referring to the map road centerline MCL to the driving mode of the mode B referring to the camera road centerline CCL (step S202). In a case where the camera road partition line CL and the map road partition line ML do not match on either side, the mode determiner 150 changes the driving mode of the mode B referring to the map road centerline MCL to the driving mode of the mode C referring to the camera road centerline CCL (step S204). In a case where the camera road partition line CL on one side is lost and the camera road partition line CL on the other side and the map road partition line ML do not match, the mode determiner 150 changes the driving mode of the mode B referring to the map road centerline MCL to the driving mode of the mode C referring to the camera road partition line CL on the other side (step S206). In a case where the camera road partition lines CL on both sides are lost, the mode determiner 150 changes the driving mode of the mode B referring to the map road centerline MCL to the driving mode of the mode C referring to the camera road partition lines CL obtained in the immediately preceding control cycle (step S208). This completes the processing of the present flowchart.

Figure 8:
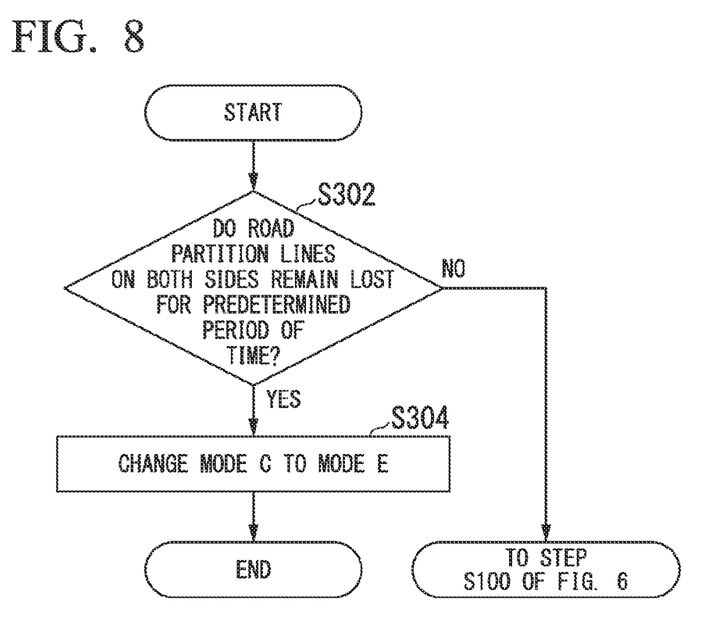
FIG. 8 is a flowchart illustrating another example of a flow of operations which are executed by the vehicle control device according to the embodiment.

FIG. 8 is a flowchart illustrating another example of a flow of operations which are executed by the vehicle control device according to the embodiment. The processing of the flowchart shown in FIG. 8 is executed in a case where the driving mode of the mode B referring to the map road centerline MCL is changed to the driving mode of the mode C referring to the camera road partition lines CL obtained in the immediately preceding control cycle in step S208 of FIG. 7.

First, the mode determiner 150 determines whether the driving mode is changed to the driving mode of the mode C referring to the camera road partition lines CL obtained in the immediately preceding control cycle and then the camera road partition lines CL on both sides remain lost for a predetermined period of time (step S302). In a case where it is determined that the camera road partition lines CL on both sides remain lost for a predetermined period of time, the mode determiner 150 changes the driving mode from the mode C to the mode E (step S304). On the other hand, in a case where it is determined that the lost camera road partition lines CL on both sides have been resolved within the predetermined period, the mode determiner 150 transitions the process to step S100 in FIG. 6. Thereby, the margin TTLC is recalculated, and in a case where the recalculated margin TTLC is equal to or greater than the second threshold, the mode determiner 150 restores the driving mode of the mode C referring to the camera road partition lines CL obtained in the immediately preceding control cycle to the driving mode of the mode B referring to the map centerline MCL. In a case where the recalculated margin TTLC is less than the second threshold, the appropriate driving mode is set in the processes of step S104 and the subsequent steps. This completes the processing of the present flowchart.

According to the present embodiment described above, while the driving mode of the mode B referring to the map road centerline MCL is being executed, the margin (distortion) of the map road centerline MCL is calculated on the basis of the second map information 62 alone, and the driving mode is changed to a driving mode according to the calculated margin. Thereby, it is possible to detect the distortion of the map road centerline on the basis of the map information alone and to appropriately change driving control of the vehicle.

The above-described embodiment can be represented as follows.

A vehicle control device including:
a storage device having a program stored therein; and
a hardware processor,
wherein the hardware processor executes the program stored in the storage device, to thereby
acquire a camera image obtained by imaging a peripheral situation of a vehicle,
control steering and acceleration or deceleration of the vehicle on the basis of the camera image and map information irrespective of an operation of a driver of the vehicle,
determine a driving mode of the vehicle to be any of a plurality of driving modes including a first driving mode and a second driving mode and change the driving mode of the vehicle to a more task-intensive driving mode in a case where a task related to the determined driving mode is not executed by the driver, the second driving mode being a driving mode in which a task imposed on the driver is lighter than in the first driving mode, and some of the plurality of driving modes including at least the second driving mode being performed by controlling the steering and acceleration or deceleration of the vehicle irrespective of the operation of the driver of the vehicle,
calculate a margin for the vehicle to continue traveling in the second driving mode on the basis of a speed of the vehicle and a distance to an intersection between a map road centerline indicated in the map information and any one of map road partition lines on both sides, and
determine whether to cause the vehicle to continue the second driving mode referring to the map road centerline on the basis of the margin when the vehicle is traveling in the second driving mode referring to the map road centerline.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
   a storage medium having computer-readable instructions stored therein; and
   a processor connected to the storage medium,
   wherein the processor executes the computer-readable instructions, to thereby
   acquire a camera image obtained by imaging a peripheral situation of a vehicle,
   control steering and acceleration or deceleration of the vehicle on the basis of the camera image and map information irrespective of an operation of a driver of the vehicle,
   determine a driving mode of the vehicle to be any of a plurality of driving modes including a first driving mode and a second driving mode and change the driving mode of the vehicle to a more task-intensive driving mode in a case where a task related to the determined driving mode is not executed by the driver, the second driving mode being a driving mode in which a task imposed on the driver is lighter than in the first driving mode, and some of the plurality of driving modes including at least the second driving mode being controlled irrespective of the operation of the driver of the vehicle,
   calculate a margin for the vehicle to continue traveling in the second driving mode on the basis of a speed of the vehicle and a distance to an intersection between a map road centerline indicated in the map information and any one of map road partition lines on both sides, and
   determine whether the processor causes the vehicle to continue the second driving mode referring to the map road centerline on the basis of the margin when the vehicle is traveling in the second driving mode referring to the map road centerline.

2. The vehicle control device according to claim 1, wherein, in a case where the margin is less than a first threshold, the processor changes the second driving mode referring to the map road centerline to the first driving mode referring to a camera road partition line shown in the camera image.

3. The vehicle control device according to claim 1, wherein, in a case where the margin is equal to or greater than a second threshold, the processor causes the vehicle to continue the second driving mode referring to the map road centerline.

4. The vehicle control device according to claim 1, wherein, in a case where the margin is equal to or greater than a first threshold and less than a second threshold, the processor changes the second driving mode referring to the map road centerline on the basis of the camera image and the map information.

5. The vehicle control device according to claim 4, wherein, in a case where the margin is equal to or greater than the first threshold and less than the second threshold, and a camera road partition line shown in the camera image and the map road partition line match at least on one side, the processor changes the second driving mode referring to the map road centerline to the second driving mode referring to the camera road partition line.

6. The vehicle control device according to claim 4, wherein, in a case where the margin is equal to or greater than the first threshold and less than the second threshold, and a camera road partition line shown in the camera image and the map road partition line do not match on either side, the processor changes the second driving mode referring to the map road centerline to the first driving mode referring to the camera road partition line.

7. The vehicle control device according to claim 4, wherein, in a case where the margin is equal to or greater than the first threshold and less than the second threshold, a camera road partition line on one side is not detected from the camera image, and a camera road partition line on the other side and the map road partition line do not match, the processor changes the second driving mode referring to the map road centerline to the first driving mode referring to the camera road partition line.

8. The vehicle control device according to claim 4, wherein, in a case where the margin is equal to or greater than the first threshold and less than the second threshold, and camera road partition lines on both sides are not detected from the camera image, the processor changes the second driving mode referring to the map road centerline to the first driving mode referring to the camera road partition lines obtained in an immediately preceding control cycle.

9. The vehicle control device according to claim 8, wherein, in a case where a state in which the camera road partition lines on both sides are not detected continues for a predetermined period of time, the processor changes the first driving mode referring to the camera road partition line to manual driving.

10. The vehicle control device according to claim 1, wherein the second driving mode is a driving mode in which a task for grasping an operator that accepts a steering operation of the vehicle is not imposed on the driver, and the first driving mode is a driving mode in which a task for grasping the operator that accepts at least the driver's steering operation is imposed on the driver.

11. A vehicle control method comprising causing a computer to:
   acquire a camera image obtained by imaging a peripheral situation of a vehicle;
   control steering and acceleration or deceleration of the vehicle on the basis of the camera image and map information irrespective of an operation of a driver of the vehicle;
   determine a driving mode of the vehicle to be any of a plurality of driving modes including a first driving mode and a second driving mode and change the driving mode of the vehicle to a more task-intensive driving mode in a case where a task related to the determined driving mode is not executed by the driver, the second driving mode being a driving mode in which a task imposed on the driver is lighter than in the first driving mode, and some of the plurality of driving modes including at least the second driving mode being performed by controlling the steering and acceleration or deceleration of the vehicle irrespective of the operation of the driver of the vehicle;
   calculate a margin for the vehicle to continue traveling in the second driving mode on the basis of a speed of the vehicle and a distance to an intersection between a map road centerline indicated in the map information and any one of map road partition lines on both sides; and determine whether to cause the vehicle to continue the second driving mode referring to the map road centerline on the basis of the margin when the vehicle is traveling in the second driving mode referring to the map road centerline.

12. A computer readable non-transitory storage medium having a program stored therein, the program causing a computer to:

acquire a camera image obtained by imaging a peripheral situation of a vehicle;

control steering and acceleration or deceleration of the vehicle on the basis of the camera image and map information irrespective of an operation of a driver of the vehicle;

determine a driving mode of the vehicle to be any of a plurality of driving modes including a first driving mode and a second driving mode and change the driving mode of the vehicle to a more task-intensive driving mode in a case where a task related to the determined driving mode is not executed by the driver, the second driving mode being a driving mode in which a task imposed on the driver is lighter than in the first driving mode, and some of the plurality of driving modes including at least the second driving mode being performed by controlling the steering and acceleration or deceleration of the vehicle irrespective of the operation of the driver of the vehicle;

calculate a margin for the vehicle to continue traveling in the second driving mode on the basis of a speed of the vehicle and a distance to an intersection between a map road centerline indicated in the map information and any one of map road partition lines on both sides; and determine whether to cause the vehicle to continue the second driving mode referring to the map road centerline on the basis of the margin when the vehicle is traveling in the second driving mode referring to the map road centerline.

\* \* \* \* \*